Patented May 1, 1923.

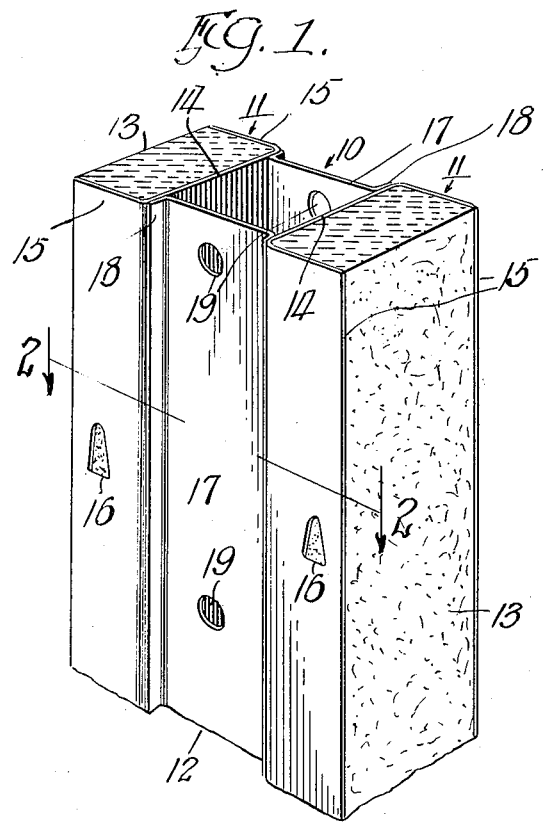
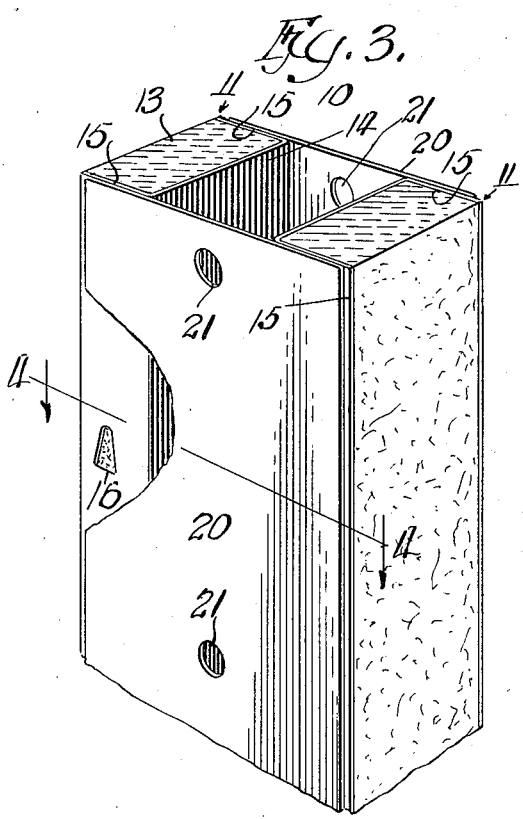
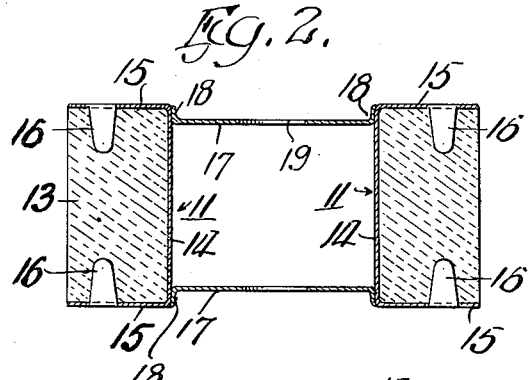
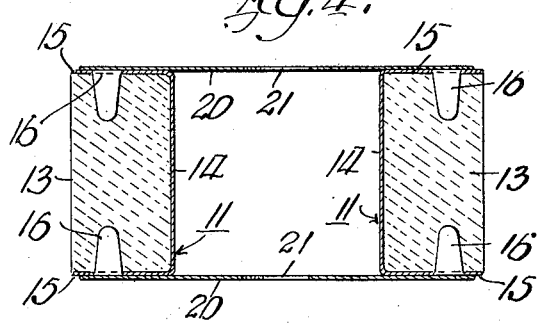
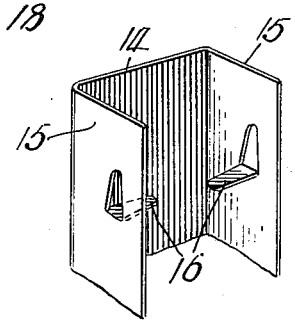

1,453,996

UNITED STATES PATENT OFFICE.

GEORGE W. RIDDLE, OF CHICAGO, ILLINOIS.

COMPOSITE STRUCTURE.

Application filed November 8, 1920. Serial No. 422,491.

*To all whom it may concern:*

Be it known that I, GEORGE W. RIDDLE, a citizen of the United States, and a resident of Chicago, in the county of Cook and State of Illinois, have invented certain new and useful Improvements in Composite Structures; and I do hereby declare that the following is a full, clear, and exact description thereof, reference being had to the accompanying drawings, and to the letters of reference marked thereon, which form a part of this specification.

This invention relates to improvement in composite structures for studding and beams and consists of the matters hereinafter described and more particularly pointed out in the appended claims.

The object of the present invention is to provide an improved construction of that type of composite structure illustrated and described in my copending application for patent on composite structure filed on the 28th day of August 1920 and bearing Serial Number 406,602.

The advantage of the present invention will more fully appear as I proceed with my specification.

In the drawings:—

Fig. 1 is a perspective view of a short length of composite structure embodying my invention.

Fig. 2 is a cross sectional view taken on the line 2—2 of Fig. 1.

Fig. 3 is a perspective view of a slightly modified form of composite structure embodying my invention.

Fig. 4 is a cross sectional view, taken on line 4—4 of Fig. 3.

Fig. 5 is a detail perspective view of a channel strip embodied in my improved composite structure.

In general, my improved composite structure comprises a thin sheet metal shell embodying a plurality of oppositely facing channels, which are connected together in spaced relation by side strips, arranged substantially in the planes of the side members of the channels, said channels holding a suitable nailing mixture.

Referring now in detail to that embodiment of the invention illustrated in Figs. 1 and 2 of the accompanying drawings, 10 indicates the sheet metal shell of the composite structure which comprises as shown, two oppositely and outwardly facing channel members 11—11 (see Fig. 5) which are connected together in spaced relation by side strips 12, each channel being adapted to receive a nailing mixture 13 made preferably of a fibrous and cementitious material.

Said channels which are made of thin sheet metal are identical in form and consists of a web 14 and lateral angularly extending side flanges 15 of a width less than that of said web. Each side flange is punched at suitable distance throughout its length to provide inwardly extending tongues 16 which are covered or embedded in the nailing mixture 13. Thus a locking bond or engagement is provided between the channels and nailing mixture which prevents the accidental displacement of the mixture from the channels during the handling of the structure to which it is subjected. The outer or exposed surface of the nailing mixture is flush with the edge of the side flanges 15, and after hardening, said mixture provides a body into which nails may be driven and will be effectively held, in attaching such material to it, as lath, plaster board or other wall forming material.

As before stated, said channels are connected together by side strips 12, which in this particular instance, consists of a wide central web 17 and narrow lateral flanges 18. Said strips are placed with their flanges 18, facing outwardly and engaging with the marginal parts of the webs of the channels, and are secured thereto in any suitable manner with the edges of the flanges 18 flush with the outer surface of the flanges 15 of the channels. Each strip 12 has a plurality of spaced holes 19 on the median line of its web to permit of the passage of electric or other conduits through the wall or partition in which my improved composite structure is used as studding.

In Figs. 3 and 4 I have illustrated a slightly modified form of my invention, wherein the same channels 11 are used, but instead of the flanged connecting strips 12 herein before described, I employ two flat strips 20—20 the margins of which overlap and engage with the side members or flanges 15 of the channels and are secured thereto in any suitable manner, preferably by spot welding. The edges of the strips 20 terminate short of the edges of the side flanges 15 of the channels so that in case the edges of the strip are not perfectly straight, they will not project beyond the edges of the flanges of the channels, to interrupt the straight smooth surface presented by the nailing mixture in said channels. Each strip 20 has a plurality of spaced holes 21 on its median line which register for the passage of electric or other conduits through the structure when the same is used as studding for walls.

The improved composite structure illustrated herein is especially adapted to take the place of studding in building construction, but its proportions may be varied so as to take the place of beams and heavier framing members. The channels being connected together on opposite sides, the structure as a whole cannot twist or warp throughout its length, but always maintains the exposed surfaces of the nailing mixture in their true parallel relation. It is easy to manufacture and is light, strong and rigid in construction and will not buckle or bend under such working load as it is intended to sustain. It may be easily cut to the desired length with the ordinary hacksaw and is absolutely non-combustible.

While in describing my invention, I have referred to certain details of mechanical construction, form and arrangement of parts, I do not wish to be limited thereto except as may be pointed out in the appended claims.

I claim as my invention:—

1. A composite structure of the kind described comprising, oppositely facing, spaced thin sheet metal channels having side members, strips secured to said channels at their sides and adapted to hold said channels in their spaced relation, a nailing mixture in said channels, and means connected with said side members to hold the nailing mixture in place therein.

2. A composite structure of the kind described comprising, two oppositely facing, spaced, thin metal channel members, a nailing mixture in said channels, said channels including side flanges which have inwardly projecting fingers extending into said nailing mixture, and strips secured at their lateral margins to said channels at their sides and holding them in their spaced relation.

In testimony that I claim the foregoing as my invention, I affix my signature in the presence of two witnesses, this 21st day of October A. D. 1920.

GEORGE W. RIDDLE.

Witnesses:
T. H. ALFREDS,
CHRISTINA DEANS.